US010259420B2

(12) United States Patent
Thomas (10) Patent No.: US 10,259,420 B2
(45) Date of Patent: Apr. 16, 2019

(54) CHAMBERED SIDE IMPACT AIRBAG (71) Applicant: GM Global Technology Operations LLC, Detroit, MI (US)

(72) Inventor: Scott D. Thomas, Novi, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 354 days.

(21) Appl. No.: 14/960,875

(22) Filed: Dec. 7, 2015

(65) Prior Publication Data

US 2017/0158158 A1    Jun. 8, 2017

(51) Int. Cl.
*B60R 21/16* (2006.01)
*B60R 21/231* (2011.01)
*B60R 21/233* (2006.01)

(52) U.S. Cl.
CPC .......... *B60R 21/231* (2013.01); *B60R 21/233* (2013.01); *B60R 2021/23161* (2013.01); *B60R 2021/23308* (2013.01)

(58) Field of Classification Search
CPC .............. B60R 21/231; B60R 21/233; B60R 2021/23161; B60R 2021/23308
USPC ............... 280/730.1, 730.2, 743.1, 743.2
See application file for complete search history.

(56) References Cited

U.S. PATENT DOCUMENTS

| | | | |
|---|---|---|---|
| 5,853,191 A | 12/1998 | Lachat | |
| 7,665,761 B1 * | 2/2010 | Green | B60R 21/18 280/730.1 |
| 8,485,551 B2 * | 7/2013 | Dainese | B60R 21/207 280/730.1 |
| 2006/0001244 A1 * | 1/2006 | Taguchi | B60R 21/23138 280/729 |
| 2007/0013174 A1 | 1/2007 | Riedel et al. | |
| 2007/0182135 A1 * | 8/2007 | Kai | B60R 21/23138 280/730.2 |
| 2008/0100045 A1 * | 5/2008 | Fukawatase | B60R 21/23138 280/730.2 |
| 2012/0119475 A1 * | 5/2012 | Choi | B60R 21/23138 280/729 |
| 2014/0151984 A1 * | 6/2014 | Fukawatase | B60R 21/233 280/730.2 |
| 2014/0159355 A1 * | 6/2014 | Fujiwara | B60R 21/23138 280/730.2 |
| 2015/0061267 A1 * | 3/2015 | Deng | B60R 21/21 280/729 |
| 2015/0115583 A1 * | 4/2015 | Azuma | B60R 21/231 280/740 |
| 2016/0107602 A1 * | 4/2016 | Nakashinna | B60R 21/233 280/728.2 |

(Continued)

FOREIGN PATENT DOCUMENTS

| | | |
|---|---|---|
| CN | 102245446 A | 11/2011 |
| JP | 2010036870 A | 2/2010 |

OTHER PUBLICATIONS

Chinese Office Action dated Jun. 20, 2018; Application No. 201611050912.5; GM Global Technology Operations LLC.; 6 pages.

*Primary Examiner* — Toan C To
(74) *Attorney, Agent, or Firm* — BrooksGroup (57) ABSTRACT

A number of variations may include an airbag comprising a first inflatable chamber having at least one gas passage which extends to a second inflatable chamber, wherein the second inflatable chamber is constructed and arranged so that it is at least partially adjacent the first inflatable chamber when the airbag is in an inflated condition.

14 Claims, 7 Drawing Sheets

(56) References Cited

U.S. PATENT DOCUMENTS

2016/0200278 A1\* 7/2016 Wiik ................. B60R 21/23138
                                                          280/729
2017/0174174 A1\* 6/2017 Ohno .................... B60R 21/239
2017/0334386 A1\* 11/2017 Park .................... B60R 21/2338

\* cited by examiner

CHAMBERED SIDE IMPACT AIRBAG

TECHNICAL FIELD

The field to which the disclosure generally relates to includes airbags.

BACKGROUND

A vehicle may include one or more airbags.

SUMMARY OF ILLUSTRATIVE VARIATIONS

A number of variations may include an airbag comprising a first inflatable chamber having at least one gas passage which extends to a second inflatable chamber, wherein the second inflatable chamber is constructed and arranged so that it is at least partially adjacent the first inflatable chamber when the airbag is in an inflated condition.

A number of variations may include an airbag comprising a first inflatable chamber and second inflatable chamber, wherein the second inflatable chamber is constructed and arranged to create a wider cross-section in an inflated condition than the first inflatable chamber alone.

Other illustrative variations within the scope of the invention will become apparent from the detailed description provided hereinafter. It should be understood that the detailed description and specific examples, while disclosing variations within the scope of the invention, are intended for purposes of illustration only and are not intended to limit the scope of the invention.

BRIEF DESCRIPTION OF THE DRAWINGS

Select examples of variations within the scope of the invention will become more fully understood from the detailed description and the accompanying drawings, wherein.

DETAILED DESCRIPTION OF ILLUSTRATIVE VARIATIONS

The following description of the variations is merely illustrative in nature and is in no way intended to limit the scope of the invention, its application, or uses.

Figure 1:
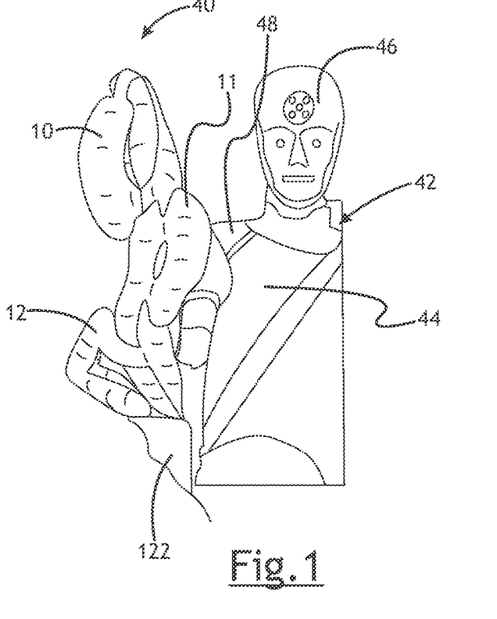
FIG. 1 illustrates a perspective view of a chambered side airbag in an inflated condition with an occupant according to a number of variations.
Figure 26:
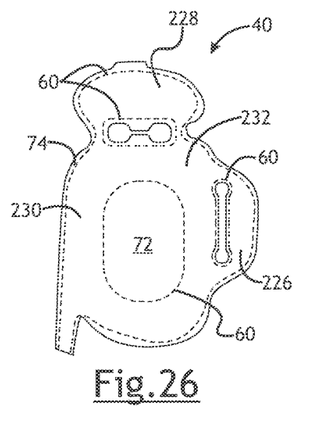
FIG. 26 illustrates a chambered side airbag having a main chamber, second chamber, and third chamber in an unfolded condition according to a number of variations.
Figure 27:
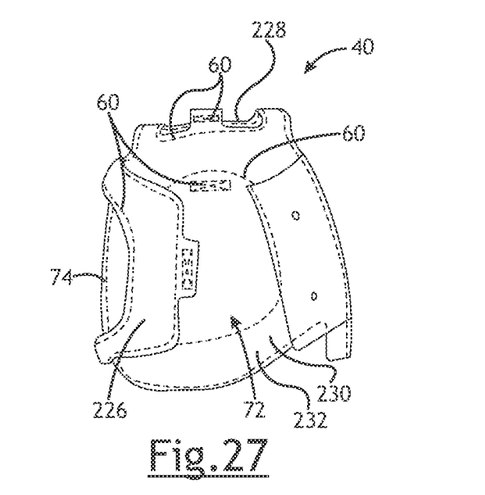
FIG. 27 illustrates a chambered side airbag where the second chamber and third chamber are folded onto the main chamber according to a number of variations.
Figure 28:
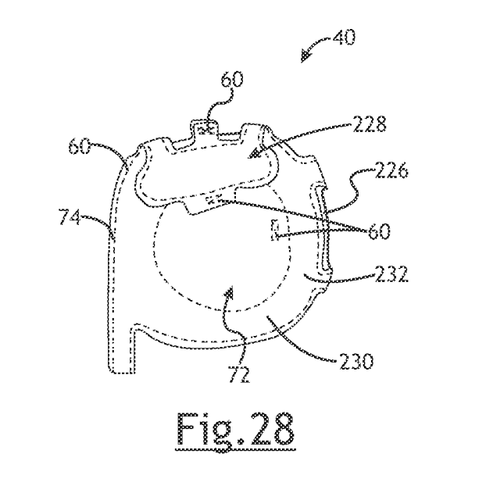
FIG. 28 illustrates a chambered side airbag where the second chamber and third chamber are folded onto the main chamber according to a number of variations.

Referring to FIG. 1, in a number of variations, a chambered side airbag 40 may be used in a vehicle to prevent one or more vehicle occupants from impacting interior components within the vehicle such as, but not limited to, the center console of a vehicle 122, during an impact event. The chambered side airbag 40 may also be used to prevent a driver side occupant and a passenger side occupant from impacting each other during an impact event. It may also prevent an occupant from contacting intruded vehicle structure or a seat on the laterally opposite side of the vehicle. In a number of variations, the chambered side airbag 40 may be constructed and arranged maintain both a high internal pressure and a low cushion volume in an inflated condition which may provide laterally wider coverage for an occupant during an impact event. The chambered side airbag 40 may be constructed and arranged to at least one of hook the shoulder 48 and/or torso 44 of an occupant 42, such as with chamber 11, which may hold the occupant 42 within the chambered side airbag 40 which may improve lateral restraint of the occupant; provide an aligned reaction surface for a center console 122; provide inflated restraint in far side impact events in vehicles without a center console which may assist in restrain of the occupant 42; interact with the center console 122 such as with chamber 12 and transmit support from this reaction surface, or provide thicker cushioning adjacent the head 46 of the occupant 42 such as with additional chamber 10 where head to head contact may occur between adjacent occupants during a side impact event. The chambered side airbag 40 may include at least one of a forward chamber which may extend from a forward portion of a main chamber or an upper chamber which may extend from a top portion of the main chamber as will be discussed below. It is noted that the main chamber 52, 82, 104, 130, 156, 162, 188, 200, 230 may be any number of configurations based on the design parameters of the vehicle. The shape of the main chamber 52, 82, 104, 130, 156, 162, 188, 200, 230 may include, but is not limited to, elements that are a substantially elongated tubular shape in an inflated condition, variations of which are illustrated in FIGS. 7-12 and 23-25, or a substantially rounded shape, a variation of which is illustrated in FIGS. 26-28. The chambered side airbag 40 may comprise a woven cushion which may allow for smaller packaging or may be of a cut and sew construction, likely with silicone sealing. The chambered airbag may also be located on the seat on either the inboard side where it would deploy near the lateral center of the vehicle or outboard side where it would deploy near an outer structure of the vehicle. It may also be mounted to a body structure or a vehicle door.

Referring to FIGS. 2-12, in a number of variations, the second chamber 50, 78, 102, 128 may be positioned laterally adjacent a front portion 54, 84, 106, 132 of the main chamber 52, 82, 104, 130 and may be constructed and arranged to deploy forward of an occupant's torso 44. The second chamber 50, 78, 102, 128 may be constructed and arranged to hook or capture an occupant's upper torso 44 and/or shoulder 48 to hold the occupant within the cushion 62, 88, 112, 138 of the chambered side airbag 40.

Figure 2:
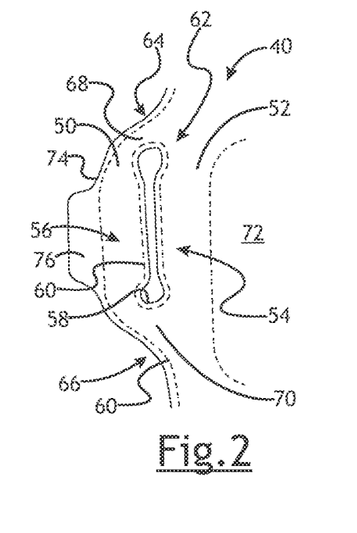
FIG. 2 illustrates a partial view of a chambered side airbag in an unfolded condition according to a number of variations.
Figure 3:
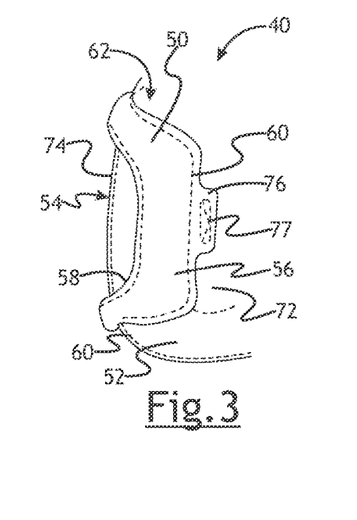
FIG. 3 illustrates a partial view of a chambered side airbag where the second chamber is folded onto the main chamber according to a number of variations.

Referring to FIGS. 2-3, in one variation, the second chamber 50 may extend horizontally from a front portion 54 of the main chamber 52 and may include a length less than the main chamber 52. The second chamber 50 may be constructed and arranged to form a tube-like shape 56 in an inflated condition. One or more openings 58 may extend vertically between a portion of the second chamber 50 and the main chamber 52. A sew line 60 which is optionally silicone sealed may extend around the one or more openings 58 as well as the perimeter and inactive/non-inflatable regions 72 to form the inflatable portion of the cushion 62. In a number of variations, a first gas passage 68 may extend between the main chamber 52 and the second chamber 50 at a top portion 64 of the cushion 62 and a second gas passage 70 may extend between the main chamber 52 and the second chamber 50 at a bottom portion 66 of the cushion 62. In one variation, the first and/or second gas passage 68, 70 may be constructed and arranged to include a curve and/or may be angled and may act as an orientation feature to orient the second chamber 50 relative to the main chamber 52. The second chamber 50 may be folded over onto the main chamber 52 and attached to the main chamber 52 in the cushion manufacturing process, a variation of which is illustrated in FIG. 3. In one variation, an inactive/uninflatable region 72 on the second chamber 50 including, but not limited to, the cushion selvage 74, may then be sewn to one or more inactive/uninflatable regions 72 on the main chamber 52, a variation of which is also illustrated in FIG. 3. In one variation, the second chamber 50 may include a tab 76 which may extend from the cushion selvage 74 of the second chamber 50, a variation of which is also illustrated in FIG. 3, which may be used to hold the second chamber 50 onto the inactive/uninflatable region 72 such as by stitching 77.

Figure 4:
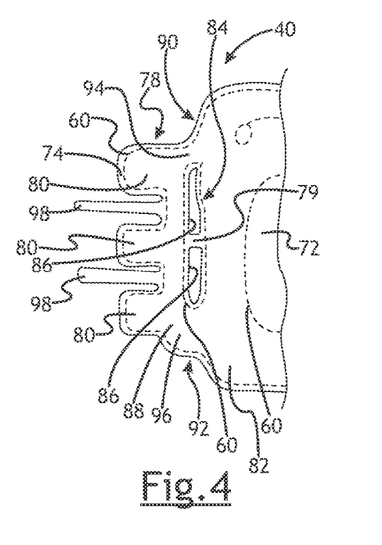
FIG. 4 illustrates a partial view of a chambered side airbag in an unfolded condition according to a number of variations.
Figure 5:
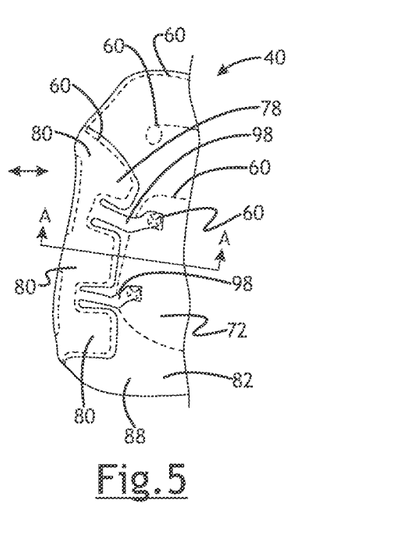
FIG. 5 illustrates a partial view of a chambered side airbag where the second chamber is folded onto the main chamber according to a number of variations.
Figure 6:
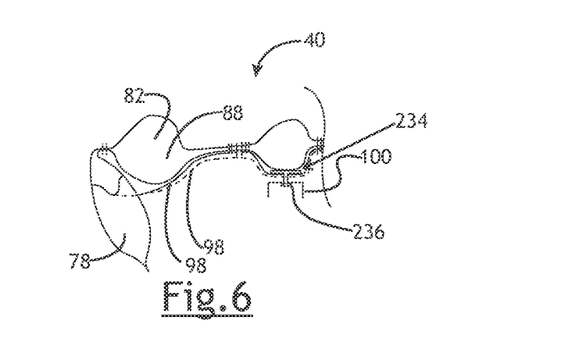
FIG. 6 illustrates a section view taken along A-A of FIG. 5 according to a number of variations.

Referring to FIGS. 4-6, in one variation, the second chamber 78 may comprise one or more grabber protrusions 80 including, but not limited to, three grabber protrusions 80, which may extend horizontally from the frontal portion 84 of the main chamber 82. These grabber protrusions 80 may interact with the occupant's torso and arm with the goal that the localized arm may go between the protrusions or deflect one of the protrusions so that the torso may move laterally into the cushion 88 and the protrusions below and above the arm then may be adjacent the torso and capture it to control its motion. One or more openings 86 may extend vertically between a portion of the second chamber 78 and the main chamber 82. A sew line 60 with optional silicone sealing may extend around the one or more openings 86 as well as the perimeter and inactive/non-inflatable regions 72 to form the inflatable portion of the cushion 88. In a number of variations, a first gas passage 94 may extend between the main chamber 82 and the second chamber 78 at a top portion 90 of the cushion 88 and a second gas passage 96 may extend between the main chamber 82 and the second chamber 78 at a bottom portion 92 of the cushion 88. In one variation, the first gas passage 94 and/or the second gas passage 96 may include a curve and/or may be angled and may act as an orientation feature to orient the second chamber 78 relative to the main chamber 82. In a similar manner, a middle gas passage 79 may also be utilized. In a number of variations, one or more straps 98 may be positioned between each grabber protrusion 80 of the second chamber 78 and may extend horizontally from the second chamber 78. The one or more straps 98 may be integral with the cushion 88 or may be separately attached to the cushion 88. In one variation, the one or more straps 98 may be constructed and arranged to hold the second chamber 78 in a folded inboard position against the main chamber 82. The one or more straps 98 may then be sewn to an inactive/uninflatable region 72 of the cushion 88, a variation of which is illustrated in FIG. 5 and FIG. 6 where strap 98 is depicted as a solid line. In a number of variations, the one or more straps 98 may be attached to the area where the cushion 88 attaches to the seat frame 100, a variation of which is illustrated in phantom (a dashed line) in FIG. 6. In a number of variations, the cushion 88 may be attached to a mounting bracket having at least one stud 234. The one or more straps 98 may include an opening which may be constructed and arranged to attach to the at least one stud on the mounting bracket 234. The mounting bracket 234 may then be attached to the seat frame 100 via at least one nut 236, a variation of which is also illustrated in FIG. 6. In addition, the at least one stud that the strap 98 attaches to may be part of the inflator or part of a clamp on an inflator in other module constructions that either have a mounting bracket 234 or do not have the mounting bracket 234.

Figure 7:
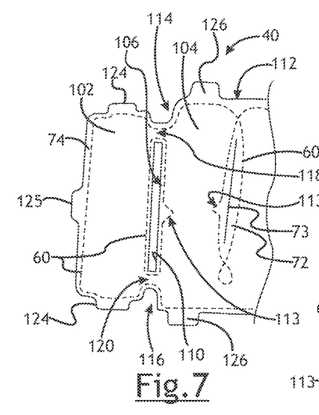
FIG. 7 illustrates a partial view of a chambered side airbag in an unfolded condition according to a number of variations.
Figures 8, 9, 11, 12:
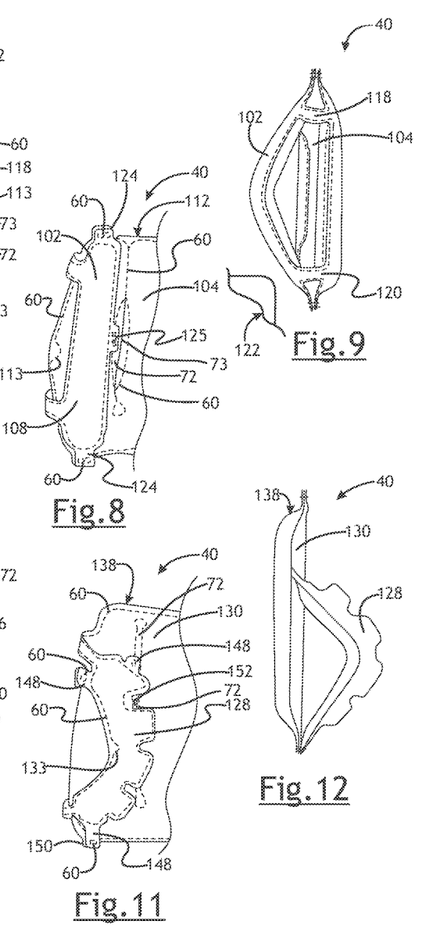
FIG. 8 illustrates a partial view of a chambered side airbag where the second chamber is folded onto the main chamber according to a number of variations.
FIG. 9 illustrates a front view of a chambered side airbag according to a number of variations.
FIG. 11 illustrates a partial view of a chambered side airbag where the second chamber is folded onto the main chamber according to a number of variations.
FIG. 12 illustrates a front view of a chambered side airbag according to a number of variations.

Referring to FIGS. 7-9, in a number of variations, the second chamber 102 may extend horizontally from a front portion 106 of the main chamber 104 and may include a length approximately equal to but slightly shorter than the length of the main chamber 104. The second chamber 102 may be constructed and arranged to form a tube-like shape 108 in an inflated condition. An opening 110 may extend vertically between the second chamber 102 and the main chamber 104, a variation of which is illustrated in FIG. 7. A sew line 60 with optional silicone sealant may extend around the one or more openings 110 as well as the perimeter and inactive/non-inflatable regions 72 to form the inflatable portion of the cushion 112. In a number of variations, a first gas passage 118 may extend between the main chamber 104 and the second chamber 102 at a top portion 114 of the cushion 112 and a second gas passage 120 may extend between the main chamber 104 and the second chamber 102 at a bottom portion 116 of the cushion 112. In one variation, the first gas passage 118 and/or the second gas passage 120 may include a curve and/or may be angled and may act as an orientation feature to orient the second chamber 102 relative to the main chamber 104. In a number of variations, the second chamber 102 may bend relative to the main chamber 104 so that the second chamber 102 may bow inboard so that it may interact with a center console 122 in an inflated condition and use the center console 122 for support as a reaction surface, a variation of which is illustrated in FIG. 9. This may provide support for the chambered side airbag 40. In a number of variations, the main chamber 104 may have a reduced cross-section portion 113 to initiate the bend in the chamber. In a number of variations, the main chamber 104 and the second chamber 102 may also include one or more tabs 124, 126 which may align with each other when the second chamber 102 is folded onto the main chamber 104, a variation of which is illustrated in FIG. 8. In one variation, the tabs 124, 126 may then be sewn together to hold the second chamber 102 in the folded position. In a number of variations, one or more tabs 125 on the second chamber 102 may also be sewn to an inactive/uninflatable region 72 of the main chamber 104, a variation of which is also illustrated in FIG. 8. The inactive/uninflatable region 72 may have an opening/cut line 73 that helps enable the second chamber 102 to bow relative to the main chamber 104.

Figure 10:
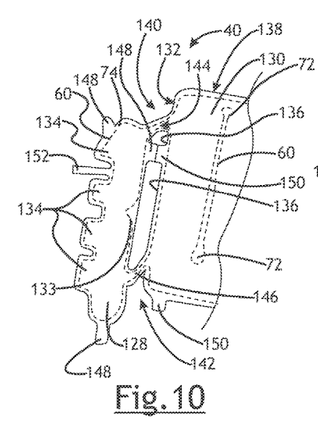
FIG. 10 illustrates a partial view of a chambered side airbag in an unfolded condition according to a number of variations.

Referring to FIGS. 10-12, in a number of variations, the second chamber 128 may both bend outward from the main chamber 130 and have grabber protrusions 134. The second chamber 128 may comprise four grabber protrusions 134 which may extend horizontally from the front portion 132 of the main chamber 130. It is noted that four grabber protrusions 134 are discussed for illustrative purposes only; however, one or more grabber protrusions 134 may be used without departing from the scope of the invention. These grabber protrusions 134 may interact with the occupant's torso and arm with the goal that the localized arm may go between the protrusions or deflect one of the protrusions so that the torso may move laterally into the cushion and the protrusions below and above the arm then may be adjacent the torso and capture it to control its motion. One or more openings 136 may extend vertically between a portion of the second chamber 128 and the main chamber 130, a variation of which is illustrated in FIG. 10. One or more sew lines 60 which are optionally silicone sealed may extend around the one or more openings 136 as well as the perimeter and inactive/non-inflatable regions 72 to form the inflatable portion of the cushion 138. In a number of variations, a first gas passage 144 may extend between the main chamber 130 and the second chamber 128 at a top portion 140 of the cushion 138 and a second gas passage 146 may extend between the main chamber 130 and the second chamber 128 at a bottom portion 142 of the cushion 138. In one variation, the first gas passage 144 and/or the second gas passage 146 may include a curve and/or may be angled and may act as an orientation feature to orient the second chamber 128 relative to the main chamber 130. In a number of variations, the second chamber 128 may be folded upward at angle so that the second chamber 128 aligns with the front portion 132 of the main chamber 130 so that the second chamber 128 curves or bends outboard once final cushion assembly has been completed, variations of which are illustrated in FIGS. 11-12. This may assist in restraint of occupants 42 in far side impact events in vehicles which do not include a center console and may also provide restraint between a first occupant and a second occupant. In a number of variations the second chamber 128 may have a reduced cross-section portion 133 to initiate the bend in the chamber. In a number of variations, the main chamber 130 and the second chamber 128 may each include one or more tabs 148, 150 which may align with each other when the second chamber 128 is folded onto the main chamber 130, variations of which are illustrated in FIGS. 10-11. In one variation, the tabs 148, 150 may then be sewn together to hold the second chamber 128 in the folded position to complete the cushion assembly. In a number of variations, the one or more tabs 148, 150 on the second chamber 128 may also be sewn to an inactive/uninflatable region 72 of the main chamber 130. In a number of variations, one or more straps 152 may be positioned between two or more of the grabber protrusions 134 of the second chamber 128 and may extend horizontally from the second chamber 128. In one variation, the one or more straps 152 may be constructed and arranged to hold the second chamber 128 in the folded outboard position against the main chamber 130. The one or more straps 152 may then be sewn to an inactive/uninflatable region 72 of the cushion 138, a variation of which is illustrated in FIG. 11. In a number of variations, the one or more straps 152 may be attached to the area where the cushion 138 attaches to the seat frame 100 as discussed above.

Figure 13:
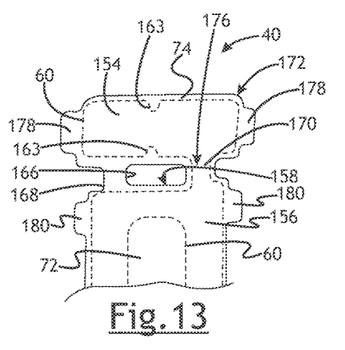
FIG. 13 illustrates a partial view of a chambered side airbag in an unfolded condition according to a number of variations.
Figure 14:
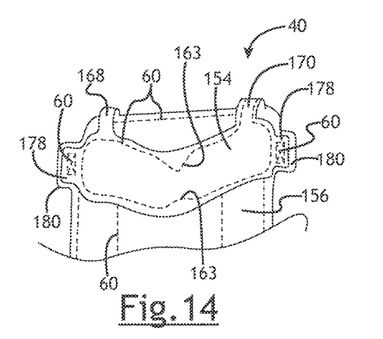
FIG. 14 illustrates a partial view of a chambered side airbag where the second chamber is folded onto the main chamber according to a number of variations.
Figure 15:
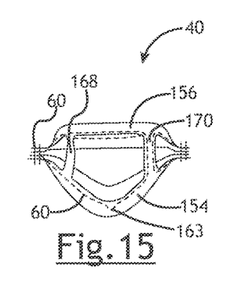
FIG. 15 illustrates a top view of a chambered side airbag according to a number of variations.
Figure 16:
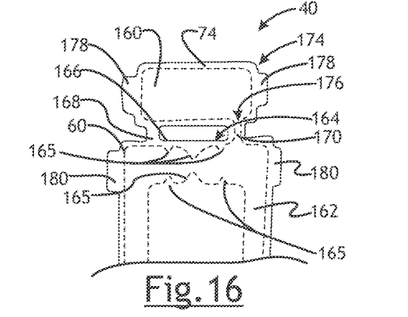
FIG. 16 illustrates a partial view of a chambered side airbag in an unfolded condition according to a number of variations.
Figure 17:
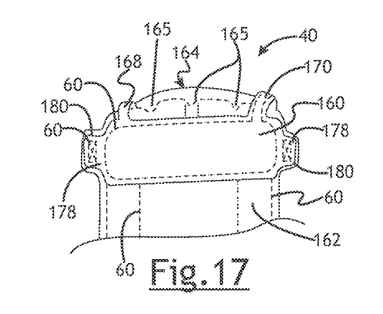
FIG. 17 illustrates a partial view of a chambered side airbag where the second chamber is folded onto the main chamber according to a number of variations.
Figure 18:
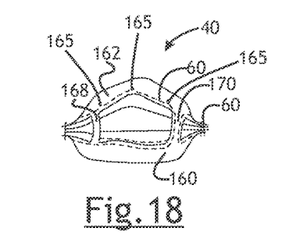
FIG. 18 illustrates a top view of a chambered side airbag according to a number of variations.

Referring to FIGS. 13-18, in a number of variations, the second chamber 154, 160 may extend vertically from a top portion 158, 164 of the main chamber 156, 162. In this variation, the second chamber 154, 160 may provide wider cushion coverage adjacent the occupant's head 46 which may prevent or mitigate head to head contact between laterally adjacent occupants or objects adjacent the occupant's head during a side impact event. In one variation, the second chamber 154 may be substantially rectangular in shape, and may be tubular in an inflated condition. In one variation, the second chamber 154 may have a width greater than the width of the main chamber 156, a variation of which is illustrated in FIGS. 13-15. In a number of variations, the second chamber 160 may have a width less than the width of the main chamber 162, a variation of which is illustrated in FIGS. 16-18. In a number of variations, at least one opening 166 may extend between the main chamber 156, 162 and the second chamber 154, 160 and may define a first and second strap 168, 170 of material between the main chamber 156, 162 and the second chamber 154, 160. One or more sew lines 60 with optional silicone sealing may extend around the at least one opening 166 as well as the perimeter and inactive/non-inflatable regions 72 to form the inflatable portion of the cushion 172, 174. One or both of the straps 168, 170 may form a gas passage 176 (shown only for strap 170) between the main chamber 156, 162 and the second chamber 154, 160. The main chamber 156, 162 and the second chamber 154, 160 may each also include one or more tabs 178, 180 which may align with each other when the second chamber 154, 160 is folded over onto the main chamber 156, 162. The tabs 178, 180 may then be sewn together to hold the second chamber 154, 160 in the folded position to complete the cushion assembly. In a variation where the second chamber 154 has a width greater than the main chamber 156, the second chamber 154 may bend outboard in an inflated condition, a variation of which is illustrated in FIG. 15. The second chamber 154 may have a reduced cross-section portion 163 to initiate the bend in the chamber. In a variation where the width of the second chamber 160 is less than that of the main chamber 162, the second chamber 160 may cause the main chamber 162 to bend inboard in an inflated condition, a variation of which is illustrated in FIG. 18. The main chamber 162 may have a reduced cross-section portion 165 to initiate the bend in the chamber.

Figure 19:
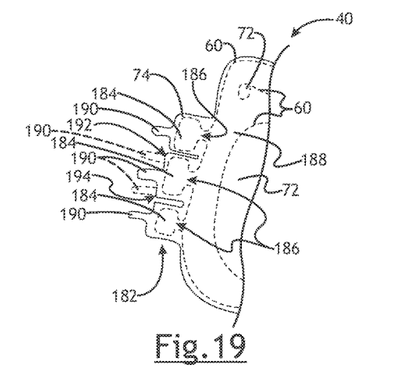
FIG. 19 illustrates a partial view of a chambered side airbag in an unfolded condition according to a number of variations.
Figure 20:
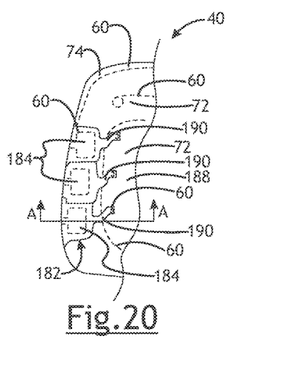
FIG. 20 illustrates a partial view of a chambered side airbag where the second chamber is folded onto the main chamber according to a number of variations.
Figure 21:
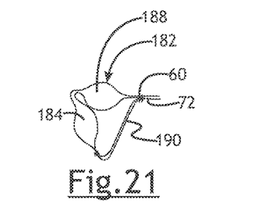
FIG. 21 illustrates a section view taken along A-A of FIG. 20 according to a number of variations.

Referring to FIGS. 19-21, in a number of variations, the second chamber 182 may comprise two or more individual grabber protrusions 184 which may each include a gas passage 186 which may extend from the individual grabber protrusions 184 to the main chamber 188. The second chamber 182 extending from the frontal portion of the main chamber 188 is illustrated with individual grabber protrusions 184, however, it is noted that individual grabber protrusions 184 may be integrated into a second chamber extending from a top portion of the main chamber. The individual grabber protrusions 184 may be any number of shapes including, but not limited to, partially rectangular or partially rounded. Each individual grabber protrusion 184 may also include a strap 190 which may extend from the individual grabber protrusion 184, a variation of which is illustrated in FIG. 19. In one variation, the straps 190 may extend from a center portion of the individual grabber protrusions 184, a variation of which is also illustrated in FIG. 19. In a number of variations, the straps 190 may extend from at least one of the upper corner 192 or the lower corner 194 of the individual grabber protrusions 184, variations of which are illustrated in phantom in FIG. 19. The individual grabber protrusions 184 may each be folded over onto the main chamber 188 so that the straps 190 may be sewn to an inactive/uninflatable region 72 on the main chamber 188, variations of which are illustrated in FIGS. 20-21.

Figure 22:
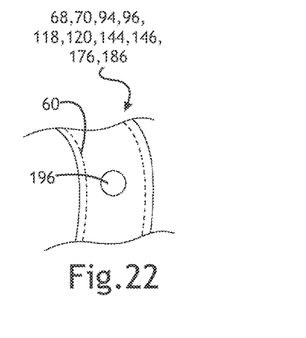
FIG. 22 illustrates a close-up view of a sacrificial bead in a gas passage according to a number of variations.

Referring to FIG. 22, in a number of variations, any of the gas passages 68, 70, 94, 96, 118, 120, 144, 146, 176, 186 illustrated above may also include a sacrificial bead 196 within the gas passage 68, 70, 94, 96, 118, 120, 144, 146, 176, 186 which may slow the gas flow to the second chamber 50, 78, 102, 128, 154, 160, 182, 188 when the chambered side airbag 40 may be inflating. This may allow for tuning of the inflation time of the second chamber 50, 78, 102, 128, 154, 160, 182, 188. In a number of variations, any of the gas passages 68, 70, 94, 96, 118, 120, 144, 146, 176, 186 illustrated above may have an hour glass, necked down profile (not illustrated) to slow gas flow to the second chamber 50, 78, 102, 128, 154, 160, 182, 188.

Figure 23:
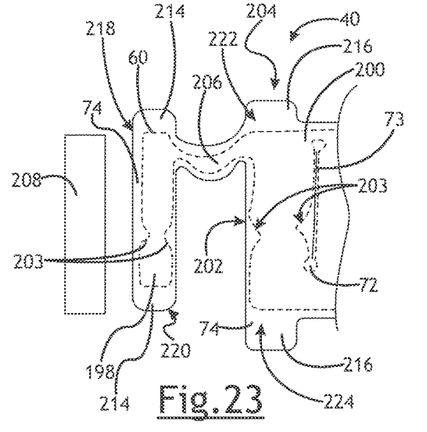
FIG. 23 illustrates a partial exploded view of a chambered side airbag in an unfolded condition according to a number of variations.
Figure 24:
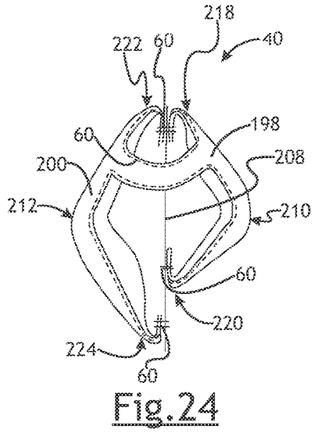
FIG. 24 illustrates a side view of a chambered side airbag according to a number of variations.
Figure 25:
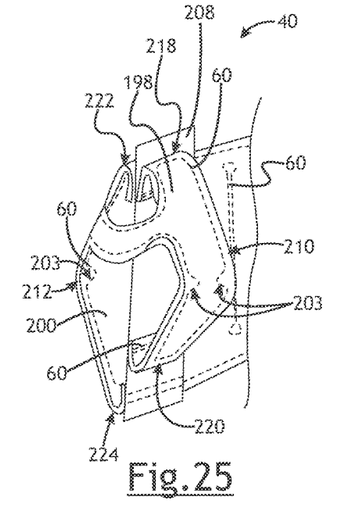
FIG. 25 illustrates a perspective partial view of a chambered side airbag according to a number of variations.

Referring to FIGS. 23-25, in a number of variations, the main chamber 200 and the second chamber 198 may be constructed and arranged to form a first and a second bent portion 210, 212. In this variation, a second chamber 198 may extend from at least one of the forward portion 202 of the main chamber 200 or the top portion 204 of the main chamber 200. The second chamber 198 may be attached to the main chamber 200 by a gas passage 206 which may extend between the second chamber 198 and the main chamber 200. In one variation, the gas passage 206 may be curved and/or angled. In a number of variations, the main chamber 200 may include an inactive/uninflatable region 72 which may have an opening/cut line 73 that enables the main chamber 200 to bow laterally, a variation of which is illustrated in FIG. 23. A separate panel 208 may be placed between the second chamber 198 and the main chamber 200. The panel 208 may include a length longer than the length of the main chamber 200, the same length as the main chamber 200, or a length shorter than the main chamber 200 depending on design perimeters. The second chamber 198 may include one or more tabs 214 which may extend from at least one of the top end 218 or bottom end 220 of the cushion selvage 74 of the second chamber 198. In one variation, the tabs 214 on the second chamber 198 may be attached to the panel 208 at a distance so that the second chamber 198 may be bent outward, variations of which are illustrated in FIGS. 24-25. In one variation, the tabs 214 on the second chamber 198 may be folded under the second chamber 198 and sewn to the panel 208, variations of which are also illustrated in FIGS. 24-25. In a number of variations, the main chamber 200 may also include one or more tabs 216 which may extend from at least one of the top end 222 or bottom end 224 of the cushion selvage 74 of the main chamber 200, a variation of which is illustrated in FIG. 23. In one variation, the tabs 216 on the main chamber 200 may also be attached to the panel 208 at a distance so that the main chamber 200 may be bent outward, variations of which are illustrated in FIGS. 24-25. In one variation, the tabs 216 on the main chamber 200 may be folded under the main chamber 200 and sewn to the panel 208, variations of which are also illustrated in FIGS. 24-25. In one variation, the ends 218, 220, 222, 224 of the second chamber 198 and the main chamber 200 may be aligned on the panel 208 (not illustrated). In a number of variations, the ends 218, 220, 222, 224 of the second chamber 198 and the main chamber 200 may be attached at different locations, a variation of which is illustrated in FIGS. 24 and 25. A reduced cross-section portion 203 may be optionally included in the second chamber 198 or the main chamber 200 to help initiate the chamber bend.

Referring to FIGS. 26-28, in a number of variations, a chambered side airbag 40 may include a third chamber so that the chambered side airbag 40 may include both a forward chamber 226, an upper chamber 228, and a main chamber 230. In this variation, the forward chamber 226 may hook the occupant's torso and/or shoulder to hold the occupant to the cushion 232 while the upper chamber 228 may provide a laterally wider region near the occupant's head for additional restraint. In a number of variations, the upper chamber 228 may be folded over onto either side of the cushion 232. It is noted that any of the above forward chamber configurations and any of the above upper chamber configurations may be combined depending on design configurations and requirements of the vehicle. This includes having a forward chamber configuration where the main chamber bends toward the occupant and hooks the occupant's torso and/or shoulder.

Returning to FIG. 1, this variation contains a second chamber 10, third chamber 11, and fourth chamber 12 where chamber 10 provides increased head cushioning, chamber 11 provides a hook for the occupant's torso and/or shoulder, and chamber 12 provides a reaction surface for the cushion against the center console 122. Any of the variations may be applied to the chamber 10, 11, and 12 regions including configurations where the main tube bends outward or inward.

A chambered side airbag 40 may further include an inflator (not illustrated), one or more bracket assemblies (not illustrated), a housing (not illustrated), and any number of airbag components known to those skilled in the art. The inflator may be attached to the chambered side airbag 40 to fill the chambered side airbag 40 with a gas to inflate the chambered side airbag 40 during an impact event. The one or more bracket assembles may be used to attached the chambered side airbag 40 to a seat, a vehicle body, or a vehicle door. The housing, which may be a hard shell or a soft cover may be used to house the chambered side airbag 40. The chambered side airbag 40 may comprise any number of cushion constructions based on vehicle design parameters. The chambered side airbag 40 may also be folded in any number of configurations based on vehicle design parameters. The construction of the chambered side airbag 40 may also enable smaller packaging of chambered side airbag 40 which may allow for at least one airbag in the front center of a vehicle having an architecture with smaller seats with thinner side bolsters.

The following description of variants is only illustrative of components, elements, acts, products and methods considered to be within the scope of the invention and are not in any way intended to limit such scope by what is specifically disclosed or not expressly set forth. The components, elements, acts, products and methods as described herein may be combined and rearranged other than as expressly described herein and still are considered to be within the scope of the invention.

Variation 1 may include an airbag comprising a first inflatable chamber having at least one gas passage which extends to a second inflatable chamber, wherein the second inflatable chamber is constructed and arranged so that it is at least partially adjacent the first inflatable chamber when the airbag is in an inflated condition.

Variation 2 may include an airbag as set forth in Variation 1 wherein at least one first uninflatable region of the first inflatable chamber is mechanically attached to at least one second uninflatable region of the second inflatable chamber.

Variation 3 may include an airbag as set forth in any of Variations 1-2, wherein the first inflatable chamber and the second inflatable chamber are constructed and arranged from the same cushion panels.

Variation 4 may include an airbag as set forth in any of Variations 1-3 wherein the first inflatable chamber and the second inflatable chamber comprise a cushion, and wherein the cushion is woven.

Variation 5 may include an airbag as set forth in any of Variations 1-4 wherein the at least one gas passage forms an orientation feature to orient the second inflatable chamber relative to the first inflatable chamber.

Variation 6 may include an airbag as set forth in any of Variations 1-5 wherein the at least one gas passage is at least one of curved or angled so that gas can flow through it.

Variation 7 may include an airbag as set forth in any of Variations 1-6 wherein the second inflatable chamber is located on a forward portion of the first inflatable chamber and is constructed and arranged to inflate forward of an occupant's torso in an inflated condition.

Variation 8 may include an airbag as set forth in any of Variations 1-6 wherein the second inflatable chamber extends from a top portion of the first inflatable chamber.

Variation 9 may include an airbag as set in Variation 8 wherein the second inflatable chamber is constructed and arranged to inflate adjacent an occupant's head.

Variation 10 may include an airbag as set forth in Variation 9 wherein the second inflatable chamber is constructed and arranged to provide cushioning between a first occupant and at least one of a second occupant and an object adjacent the first occupant.

Variation 11 may include an airbag as set forth in any of Variations 1-10 wherein the second inflatable chamber is attached to the first inflatable chamber in a manner where at least one of the first inflatable chamber or the second inflatable chamber forms a bend in the inflated condition.

Variation 12 may include an airbag as set forth in Variation 11 wherein the inflatable chamber with the bend has a reduced cross-section portion in at least one location to enable the bend.

Variation 13 may include an airbag as set forth in Variation 11 wherein one of the first chamber or the second chamber with the inflatable bend is constructed and arranged to rest on a top portion of a center console during occupant loading of the airbag.

Variation 14 may include an airbag as set forth in any of Variations 1-13 wherein the first inflatable chamber is constructed and arranged to have a tubular shape in an inflated condition.

Variation 15 may include an airbag as set forth in any of Variations 1-14 wherein the second inflatable chamber is constructed and arranged to have a tubular shape in an inflated condition.

Variation 16 may include an airbag as set forth in any of Variations 1-15 wherein the second inflatable chamber comprises at least one inflatable grabber protrusion.

Variation 17 may include an airbag as set forth in any of Variations 1-16 further comprising a third inflatable chamber constructed and arranged so that it is adjacent the first inflatable chamber when the airbag is in an inflated condition.

Variation 18 may include an airbag as set forth in Variation 17 wherein the second inflatable chamber extends from a front portion of the first inflatable chamber and the third inflatable chamber extends from a top portion of the first inflatable chamber.

Variation 19 may include an airbag as set forth in any of Variations 1-6 further comprising at least two of the second inflatable chamber, a third inflatable chamber or a fourth inflatable chamber, wherein the second inflatable chamber extends from a front portion of the first inflatable chamber, the third inflatable chamber extends from a top portion of the first inflatable chamber and the fourth inflatable chamber extends from the front portion of the first inflatable portion, and wherein the second inflatable portion is constructed and arranged to hook at least one of an occupant's shoulder or torso, the third inflatable portion is constructed and arranged to increase head cushioning, and the fourth inflatable chamber is constructed and arranged to provide a reaction surface for the airbag against a center console.

Variation 20 may include an airbag comprising a first inflatable chamber and second inflatable chamber, wherein the second inflatable chamber is constructed and arranged to create a wider cross-section in an inflated condition than the first inflatable chamber alone.

The above description of select variations within the scope of the invention is merely illustrative in nature and, thus, variations or variants thereof are not to be regarded as a departure from the spirit and scope of the invention.

What is claimed is:

1. An airbag comprising a first inflatable chamber having at least one gas passage which extends to a second inflatable chamber, wherein the second inflatable chamber extends from a forward portion of the first inflatable chamber, and wherein the second inflatable chamber is constructed and arranged so that it is at least partially adjacent the first inflatable chamber when the airbag is in an inflated condition; wherein the second inflatable chamber is attached to the first inflatable chamber in a manner where at least one of the first inflatable chamber or the second inflatable chamber forms a bend in the inflated condition; and wherein the at least one of the first chamber or the second chamber with the inflatable bend is constructed and arranged to rest on a top portion of a center console during occupant loading of the airbag.

2. The airbag of claim 1 wherein at least one first uninflatable region of the first inflatable chamber is mechanically attached to at least one second uninflatable region of the second inflatable chamber.

3. The airbag of claim 1 wherein the first inflatable chamber and the second inflatable chamber are constructed and arranged from the same cushion panels.

4. The airbag of claim 1 wherein the first inflatable chamber and the second inflatable chamber comprise a cushion, and wherein the cushion is woven.

5. The airbag of claim 1 wherein the at least one gas passage forms an orientation feature to orient the second inflatable chamber relative to the first inflatable chamber.

6. The airbag of claim 1 wherein the at least one gas passage is at least one of curved or angled so that gas can flow through it.

7. The airbag of claim 1 wherein the second inflatable chamber is constructed and arranged to inflate forward of an occupant's torso in an inflated condition.

8. The airbag of claim 1 wherein the inflatable chamber with the bend has a reduced cross-section portion in at least one location to enable the bend.

9. The airbag of claim 1 wherein the first inflatable chamber is constructed and arranged to have a tubular shape in an inflated condition.

10. The airbag of claim 1 wherein the second inflatable chamber is constructed and arranged to have a tubular shape in an inflated condition.

11. The airbag of claim 1 wherein the second inflatable chamber comprises at least one inflatable grabber protrusion.

12. The airbag of claim 1 further comprising a third inflatable chamber constructed and arranged so that it is adjacent the first inflatable chamber when the airbag is in an inflated condition.

13. The airbag of claim 12 wherein the second inflatable chamber extends from a front portion of the first inflatable chamber and the third inflatable chamber extends from a top portion of the first inflatable chamber.

14. An airbag comprising a first inflatable chamber having at least one gas passage which extends to a second inflatable chamber, wherein the second inflatable chamber extends from a forward portion of the first inflatable chamber, and wherein the second inflatable chamber is constructed and arranged so that it is at least partially adjacent the first inflatable chamber when the airbag is in an inflated condition; wherein the second inflatable chamber is constructed and arranged to inflate adjacent an occupant's head; and wherein the second inflatable chamber is constructed and arranged to provide cushioning between a first occupant, and at least one of a second occupant or an object adjacent the first occupant.

\* \* \* \* \*